RECORDING METHOD AND APPARATUS

Filed July 11, 1966 7 Sheets-Sheet 1

INVENTORS
MARVIN SLEVEN
JOSEPH KLEIMAN
DANIEL HOBEL
BY Darby & Darby
ATTORNEYS

INVENTORS
MARVIN SLEVEN
JOSEPH KLEIMAN
DANIEL HOBEL

BY Darby & Darby
ATTORNEYS

RECORDING METHOD AND APPARATUS

INVENTORS
MARVIN SLEVEN
JOSEPH KLEIMAN
DANIEL HOBEL
BY Darby & Darby
ATTORNEYS

RECORDING METHOD AND APPARATUS

INVENTORS
MARVIN SLEVEN
JOSEPH KLEIMAN
DANIEL HOBEL
BY
Darby & Darby
ATTORNEYS

INVENTORS
MARVIN SLEVEN
JOSEPH KLEIMAN
DANIEL HOBEL
BY
Darby & Darby
ATTORNEYS

RECORDING METHOD AND APPARATUS

Filed July 11, 1966 7 Sheets-Sheet 6

INVENTORS
MARVIN SLEVEN
JOSEPH KLEIMAM
DANIEL HOBEL
BY Darby & Darby
ATTORNEYS

RECORDING METHOD AND APPARATUS

Filed July 11, 1966 7 Sheets-Sheet 7

INVENTORS
MARVIN SLEVEN
JOSEPH KLEIMAN
DANIEL HOBEL
BY
Darby & Darby
ATTORNEYS 3,479,648

RECORDING METHOD AND APPARATUS

Marvin Sleven, Joseph Kleiman, and Daniel Hobel, Los Angeles, Calif., assignors to Whittaker Corporation, Los Angeles, Calif., a corporation of California Continuation-in-part of application Ser. No. 213,442, July 30, 1962. This application July 11, 1966, Ser. No. 564,288
Int. Cl. G11b *13/00*
U.S. Cl. 340—172.5 14 Claims

ABSTRACT OF THE DISCLOSURE

A method of recording information and thereafter reproducing such information in a substantially shorter time period than that required for recording, includes the steps of serially recording successive transverse tracks of information blocks across a tape storage medium while moving the tape at a first rate of speed in a direction transverse to such tracks, and thereafter simultaneously retrieving all of the information stored in a single one of the transverse tracks while moving the tape at a rate of speed substantially higher than the recording rate.

This invention relates to a method and apparatus for storing and retrieving data and is a continuation-in-part of U.S. patent application No. 213,442, filed July 30, 1962, now abandoned.

Aircraft flight history recorders must store voluminous amounts of data pertaining to various flight parameters such as stresses, environmental factors, etc. Because of the quantity of data, the information should be recorded in highly compact fashion; in the interests of time, it is desirable to accurately retrieve all of the stored information as quickly as possible. Conventionally, prior art flight recorders employ magnetic tape which imposes certain restrictions on the tape driving rates for the storage and retrieval operations.

Accordingly, the main object of the present invention is to provide a method of recording information wherein the information is stored in tightly compressed form yet may be subsequently retrieved in a relatively short time interval.

A more specific object of the invention is to provide an improved flight recorder wherein the flight data recorded may be retrieved within a small fraction of the time required for storage.

Briefly, in accordance with the invention, the above objects are achieved by serially recording information in binary fashion across magnetic tape, the information thus being stored in transverse tracks, and thereafter retrieving or reproducing the information by simultaneously reading each of the information bits in a given transverse track. In the preferred embodiment of the invention, a plurality of recording/reproducing transducers (equal to the number of bits to be stored in a given transverse track) are arrayed across the magnetic tape. The transducers may be detachably connected to the recording circuitry of the flight recorder, which serially feeds the individual transducers, and thereafter plugged into the ground reproduction console to read the information in parallel. As in the previous application No. 213,442, it is also contemplated that the information be recorded by physically moving a transducer transversely across the tape so as to lay down the desired transverse information tracks.

The invention is explained in detail below with reference to the attached drawings, wherein.

Figure 1:
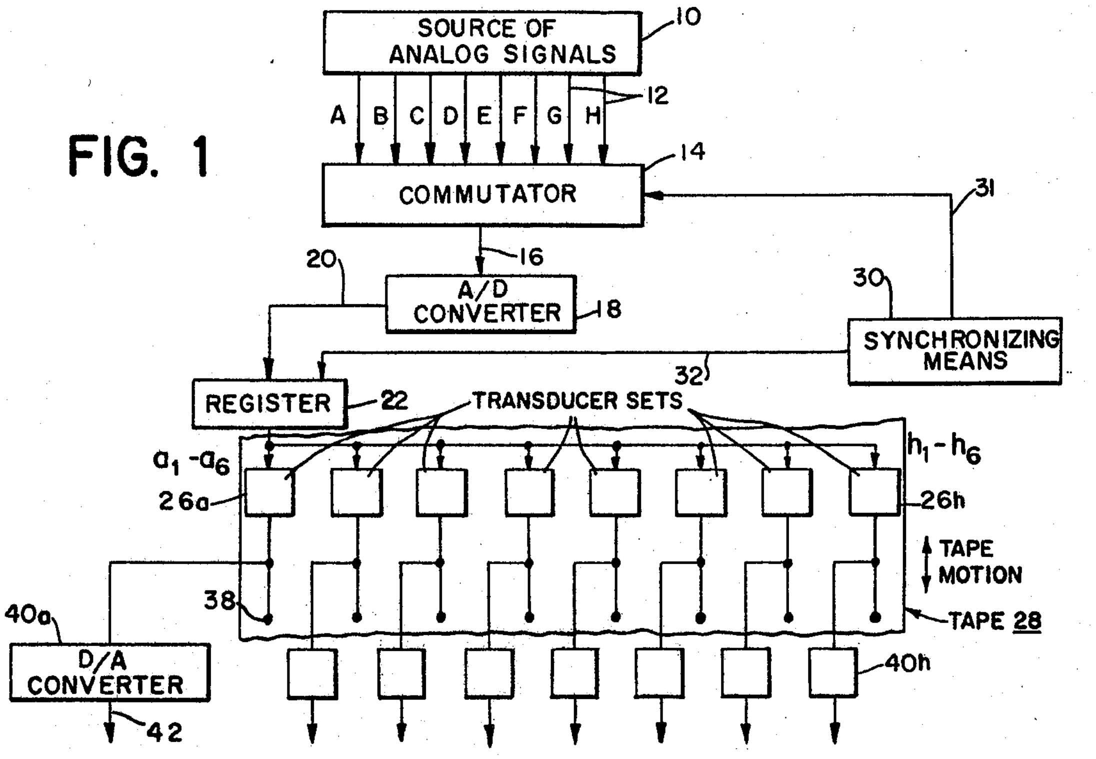
FIGURE 1 is a block diagram illustrating the overall system operation.

In FIGURE 1 analog signals A to H are produced by respective transducers (within an aircraft, for example) in a known fashion. These signals represent information which it is desired to store such as velocity, altitude, air speed, pressure, or the like, and are shown schematically as emanating from a source 10, having output lines 12 on which the signals A to H appear.

The analog signals A to H are coupled to a commutator 14 which converts the simultaneously occurring parallel signals into a consecutive series of multiplexed analog samples and couples the signals via line 16 to an analog-to-digital converter 18.

For purposes of explanation, analog signals are indicated by the use of upper case letters A to H. Digital representations corresponding to such analog signals are designated by corresponding lower case letters followed by a numeral. For example, since converter 18 converts each analog signal from line 12 into a six bit digital word, the digital representation corresponding to a multiplexed sample of analog signal A would be *a1* to *a6*.

The digital output of the converter 18 is transferred on line 20 to a register 22, which temporarily holds the digital representation corresponding to each of the multiplexed analog samples. The information in register 22 is then routed to eight transducer sets 26*a* and 26*h* and thereby recorded in conventional binary form on the tape 28 across which the transducer sets 26*a* to 26*h* are transversely arranged. Each transducer set 26 will only record (and reproduce) the digital information corresponding to one of the signals A to H, i.e. the data recorded by transducer set 26*a* represents only the multiplexed samples of signal A, and so forth. The tape 28, of course, will be movable in the direction represented by arrow 27 so that when the digital representation corresponding to the next multiplexed analog sample of signals A to H has been stored in the register 22, this information may be transferred to the transverse recording area (i.e. word position) on the tape immediately adjacent the preceding stored information.

The actual recording arrangement is described in further detail below. In fact, each of the transducer sets 26*a* to 26*h* contains seven individual recording/reproducing heads, with a further head (not shown in FIG. 1) being used to record time. Thus, a total of fifty-seven individual heads are arrayed across the tape as contrasted with the above-mentioned application No. 213,442, wherein the recording heads are separate from the reproducing heads, the former consisting of a rotor containing standard transducers arranged so that at all times one of the recording heads is scanning transversely across the tape. The present construction is an improvement in that the same heads are used for both recording and reproduction, and the more complex driving arrangement of the pervious rotor is no longer required.

As shown schematically, the overall recording operation may be timed by a synchronizing means 30 which transmits an enabling signal over line 32 to register 22 to initiate the recording operation after receipt of the digital information corresponding to a multiplexed analog sample. The output of synchronizing means 30 is also applied to the commutator 14 on line 31 to time the multiplexing of the input analog signals A to H.

The readout of the flight recorder occurs at a ground based station and, in the present invention, utilizes the transducer sets 26 to pick up the stored digital information. During read-out the tape speed will be a high multiple of the tape speed during recording (e.g. the ratio may be 100:1). Each of the transducers within a set 26 picks up a discrete signal from the tape 28 with each set retrieving the successive binary words corresponding to the multiplexed samples of one of the signals A to H, and the outputs may be taken at terminal 38 in digital form. Preferably, the parallel outputs of each transducer set 26 are coupled to respective digital-to-analog converters 40 whereby the parallel outputs appearing at channels 42 represent the initial analog inputs A to H.

Figure 2A:
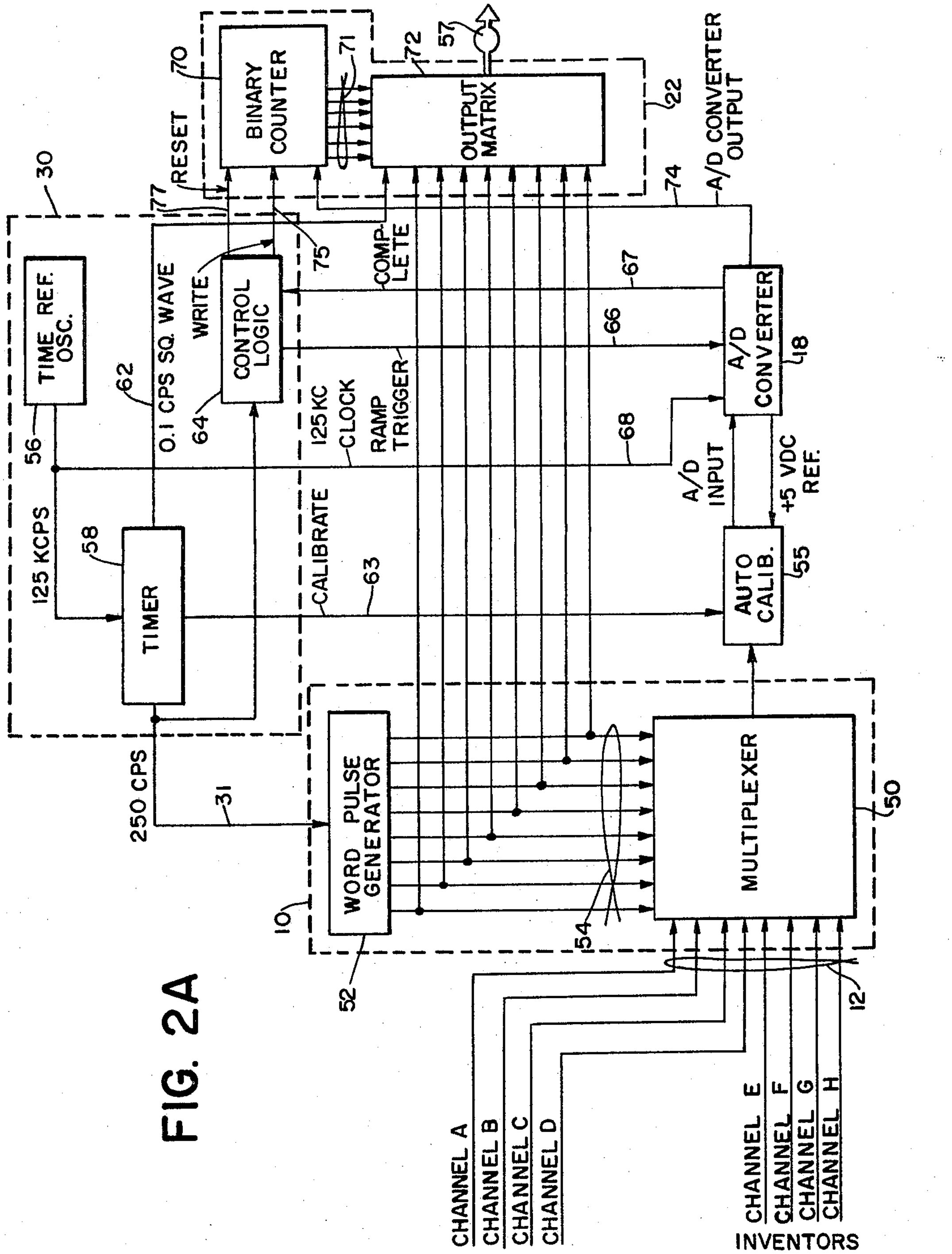
FIGURE 2A is a more detailed block diagram of the recording circuits located in the flight recorder.

FIGURE 2A is a more detailed block diagram showing the elements which make up the recording components of FIGURE 1. Thus, the commutator 10 consists of a multiplexer 50 and a word pulse generator 52. The analog inputs A to H are coupled by lines 12 to multiplexer 50. Generator 52 is responsive to pulses occurring from synchronizing means 30 and energizes one of eight output lines 54 to enable respective switches in the multiplexer 50. By way of example, if the output from synchronizing means 30 has a frequency of 250 c.p.s., a word pulse of approximately four milliseconds in duration may be applied successively to each of the lines 54 at rates of 31.25 pulses per second. The multiplexer serial output 13 fed through an automatic calibrate circuit 55 to analog-to-digital converter 18. The calibrate circuit produces a reference signal at the beginning of each flight which is recorded as a standard against which the retrieved data can be compared.

Synchronizing means 30 consists of a time reference oscillator 56, a control logic circuit 64, and a timer or frequency divider 58, which produces the 250 c.p.s. (or other frequency) timing signal and a reference timing pulse of 0.1 c.p.s. (for example) on line 62. The 0.1 c.p.s. signal on line 62 may be a squarewave of approximately fifty percent duty cycle, with a frequency accuracy of 0.1 percent for recording elapsed time. The control logic 64 produces a trigger voltage on line 66 which is coupled to the analog-to-digital converter 18 for purposes explained below. Also, the output of oscillator 56 is coupled by a line 68 to analog-to-digital converter 18.

The register 22 consists of a binary counter 70 coupled to an output matrix 72. Counter 70 receives a multipulse digital signal over line 74 from the analog-to-digital converter 18 and counts these pulses to produce a six bit binary word on its output lines 71. After each sequence of pulses from converter 18 corresponding to a single multiplexed analog sample has been counted, the control logic 64 applies a write signal over line 75 to counter 70 causing the contents thereof to be coupled to the appropriate recording heads through output matrix 72. Counter 70 is then reset by a pulse on line 77 to prepare it for the next series of incoming digital pulses. The signals are routed through matrix 72 to the proper transducer set 26 by enabling signals from word pulse generator 52.

Figure 2B:
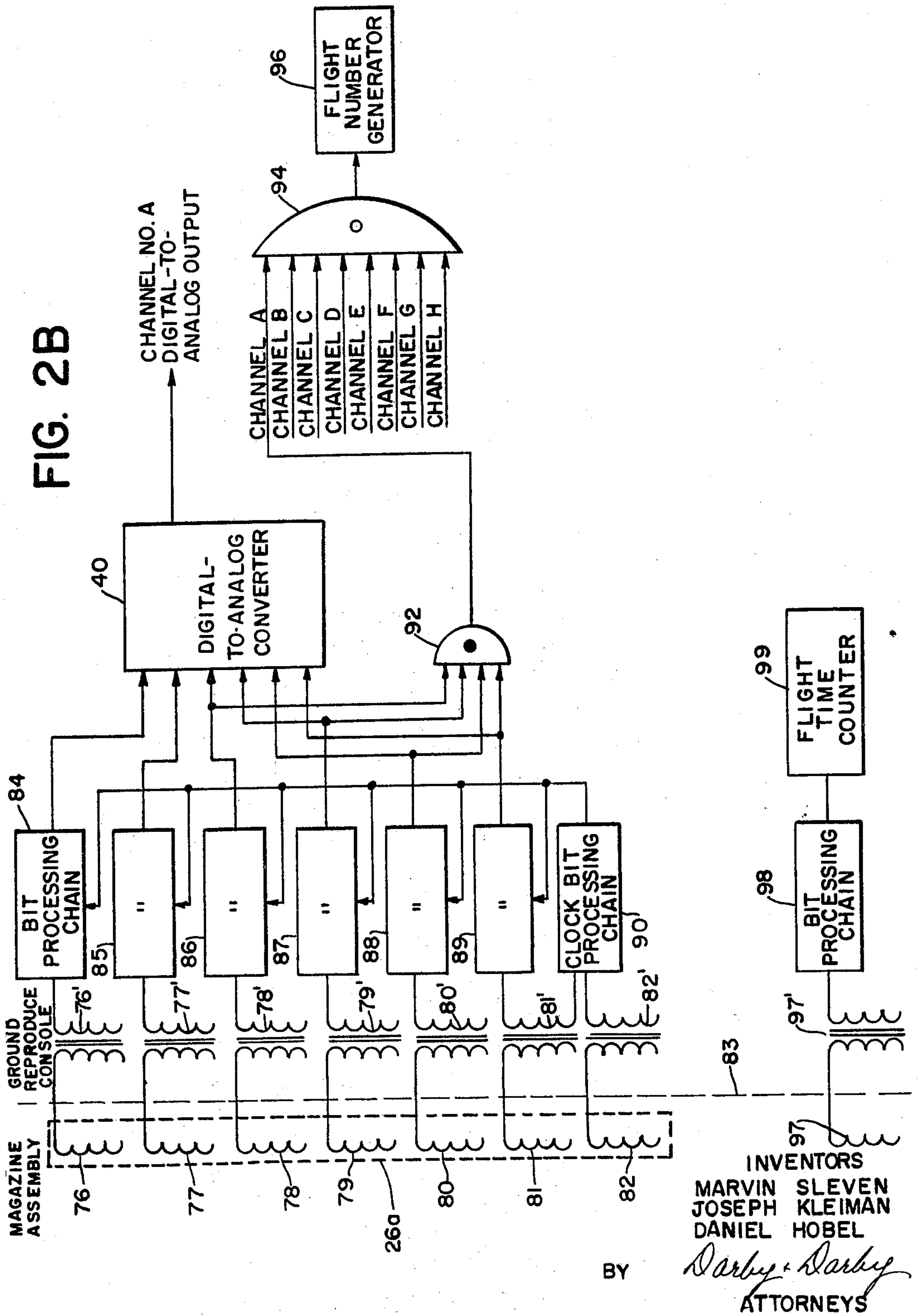
FIGURE 2B is a more detailed block diagram of the circuits located in the ground console.

The reproduction system is shown in FIGURE 2B. The circuits associated with each transducer set 26 are the same, and only the circuits associated with transducer set **26*a*** are herein described.

A set of transducer heads consists of seven individual transducers 76–82 coupled to respective bit processing chains 84–90 through transformers 76′–82′. The circuits to the right of dashed line 83 represent that portion of the circuit which will be located in the ground based console. The transducer 82 operates as a source of clock pulses to gate the output of the remaining bit processing chains 84–89 as explained below.

The outputs of processing chains 86, 87, 88 and 89 are connected in parallel to an AND gate 92. The output of each of the gates 92 for the channels A to H are coupled to a second AND gates 94, the output of which is coupled to a flight number generator 96. The flight number generator operates on the principle that the outputs of chains 86, 87, 88 and 89 will only exist during the calibration period which occurs only at the beginning of each flight. Hence, whenever the third, fourth, fifth and sixth bits of each of the recorded words are simultaneously present, the flight number counter 96 is stepped to provide an indication of the number of flights of the aircraft. In a known fashion the flight number counter may be caused to count backwards when the tape transport is moving in the reverse direction during readout. Similarly, the output of gate 94 may be used to reset a flight time counter 99 which records the total elapsed time of each flight.

A separate transducer 97 picks up the timing signal originating on line 62 (FIG. 2A) and couples it through transformer 97′ and bit processing chain 98 to a flight time counter 99. Since the signal initially had a frequency of 0.1 c.p.s. and the rate of tape speed during readout is a known multiple of that during recording (e.g. 100:1), the number of pulses received by counter 99 is proportional to the elapsed recording time at any point on the tape.

Figures 3, 4:
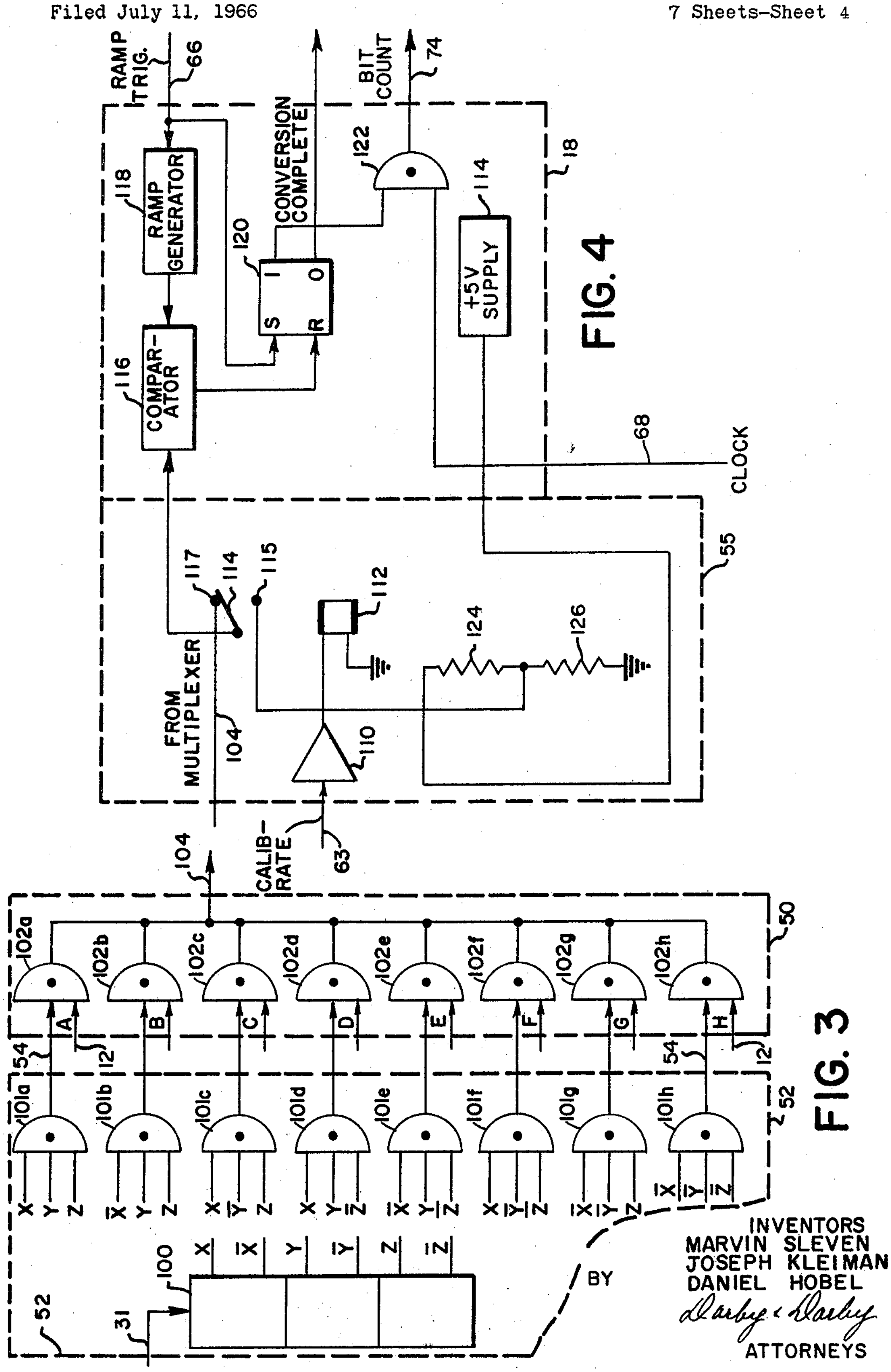
FIGURE 3 is a logic diagram of the word pulse generator and multiplexer illustrated in FIGURE 2A.
FIGURE 4 is a logic diagram of the calibration circuit and analog-to-digital converter of FIG. 2A.

FIGURE 3 is a logic diagram showing the word pulse generator 52 and multiplexer of 50 which comprise commutator 10. Generator 52 consists of a conventional three stage binary counter 100 to which is coupled the 250 c.p.s. signal from timer 58 on line 31. The counter may be considered to have three outputs X, Y, Z and their respective complements X, Y, and Z which are fed as shown to eight AND gates **101*a* to 101*h* such that the successive output lines 54 are enabled progressively depending upon the number of pulses received by the counter 100**.

Multiplexer 50 consists of eight AND gates **102*a* and 102*h* which are successively enabled by the outputs of gate 101*a* to 101*h*, respectively, to pass the input analog signals A to H to output line 104 and from there to the calibrate circuit 55**.

In FIGURE 4, the calibrate circuit 55 and analog-to-digital converter 18 are shown. By way of example, the calibrate signal appearing on line 63 from timer 58 may consist of a signal ten seconds in duration generated in any desired fashion when the flight is initiated. This signal is passed through amplifier 110, energizing a relay 112 to close contacts 114 and 115, thereby applying the five volts output of a power supply 114 (within the converter 18) to the converter input.

Analog-to-digital converter 18 is well known and consists of a comparator 116 which receives the multiplexer output through the normally closed contacts 114 and 117 and compares it with a ramp voltage from generator 118. When a comparison is obtained, the comparator resets a flip-flop 120 to inhibit an AND gate 122 thereby preventing passage of clock pulses on lines 68. It is recalled that the clock pulses on line 68 are at the 125 kc. rate of the time reference generator 56 so that the number of clock pulses passed by the gate 122 is proportional to the amplitude of the multiplexer output voltage applied to the comparator 116. The flip-flop 120 is set by a trigger signal from the control logic 64 on line 66 prior to receiving each multiplexed analog sample.

Although the automatic calibrated circuit 55 is shown as calibrating for only a single voltage it may be preferred to calibrate at half scale and full scale, for which purpose the voltage divider consisting of resistors 124 and 126 may be used. Thus, a full scale calibration signal may further be provided by timer 58 immediately subsequent to the calibrate signal on line 63 (which would be used for half scale calibration), causing a second relay (not illustrated) to switch the full voltage across resistors 124 and 126 to the comparator 116.

Figure 5:
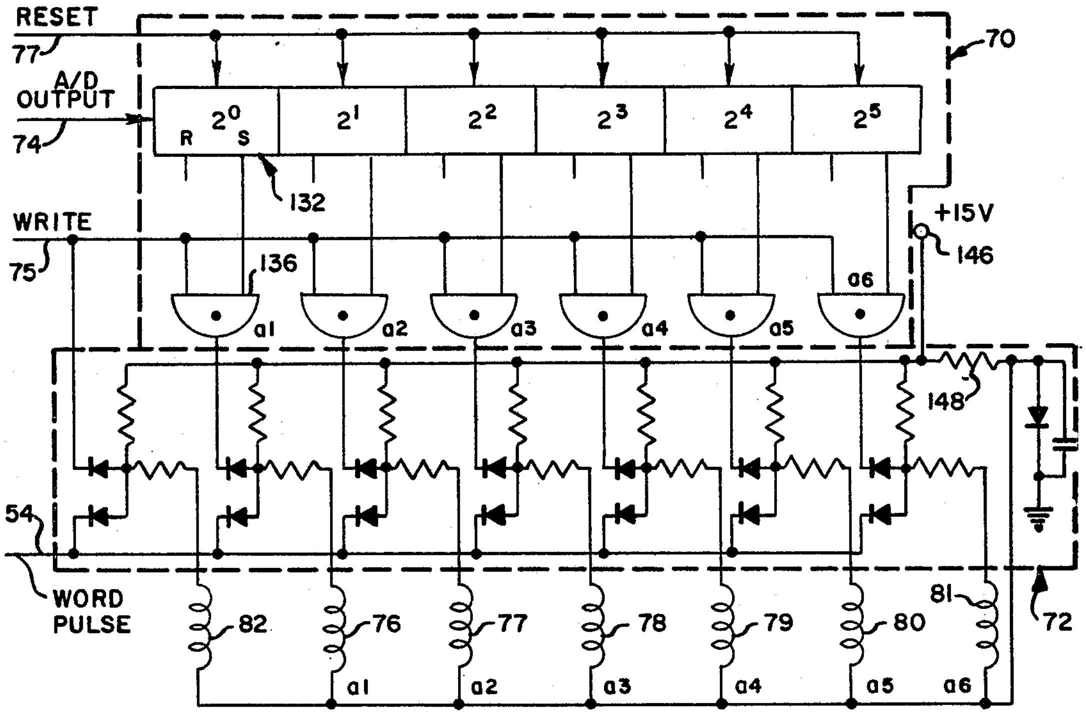
FIGURE 5 is a logic diagram of the binary counter and output matrix of FIGURE 2A.

FIGURE 5 is a logic diagram of the binary counter 70 and the output matrix 72. Counter 70 is conventional and will not be explained in detail except to note that it consists to six flip-flops 132 such that the number of pulses applied to the line 74 by the analog-to-digital converter 118 is counted, with the states of the respective flip-flops indicating in binary fashion the number of input pulses received. The SET output of each of the flip-flops is connected to a respective AND gate 136 which receives enabling inputs (i.e. the "write" signal) from the control logic 64 on line 74. Thus, after the binary counter 70 has converted the digital output of analog-to-digital converter 18 (corresponding to a single multiplexed analog sample) to binary form, the control logic causes the binary number to be shifted to the output matrix 72.

FIGURE 5 only shows the portion of the output matrix associated with the analog word A i.e. digital bits *a*1 to *a*6. Each of the channels B to H will also have a portion of the matrix corresponding to that illustrated in FIG. 5. The outputs of the matrix are coupled to the seven recording heads 76 to 82 associated with each individual channel of the tape. If, by way of example, it is desired to record by use of a return-to-zero technique, each of the heads 138 to 144 (and the remaining ones) may be biased by a fifteen volt positive source so that initially the tape is magnetized in one direction. When a binary "one" appears, a negative voltage is supplied to the head causing the tape to be saturated in the opposite direction.

The recording heads 76 to 82 are driven from a plus fifteen-volt DC supply terminal 146 through resistor 148 such that a low (e.g. 0.03 ma.) negative current flows in the recording heads in the absence of a pulse from the gates 136. The negative current flow supplies no bias for the recording tape and is used to compensate for residual magnetism in the recording heads. This recording technique is known.

Figure 6:
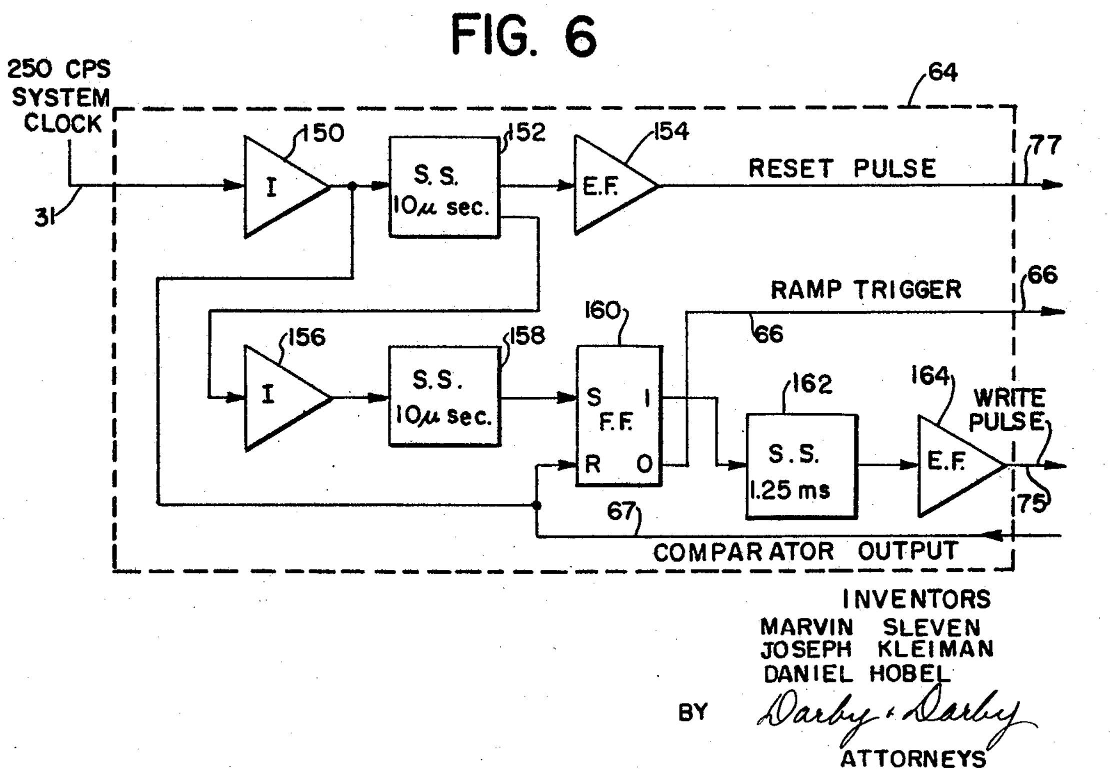
FIGURE 6 is a logic diagram of the control logic of FIGURE 2A.
Figure 7:
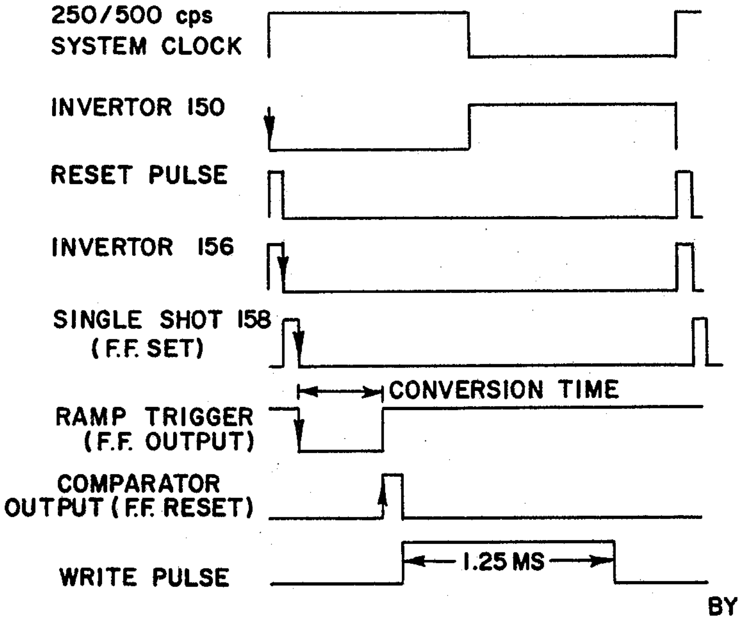
FIGURE 7 is a timing chart showing the wave forms generated within the logic circuit of FIGURE 6.

The logic diagram of the control logic circuit 64 is shown in FIGURE 6 with the corresponding timing diagram illustrated in FIGURE 7. The incoming system clock pulse on line 31 is coupled through an inverter 150 to a single-shot multivibrator 152, the output of which is fed to an emitter follower 154 as the reset pulse. The other output of the single-shot 152 is coupled through inverter 156 to a second ten microsecond single-shot multivibrator 158 which thereafter sets a flip-flop 160. Flip-flop 160 has been reset by the initial system clock pulse on line 31 so that after the delay inserted by the single-shots 152 and 158, a third single-shot 162 is pulsed to produce an output pulse through emitter follower 164 of 1.25 milliseconds' duration. The reset output of flip-flop 160 serves as the ramp trigger pulse on line 66 with the flip-flop being reset by the comparator output pulse from the analog-to-digital converter appearing on line 67 as discussed above.

Figures 8A, 8B:
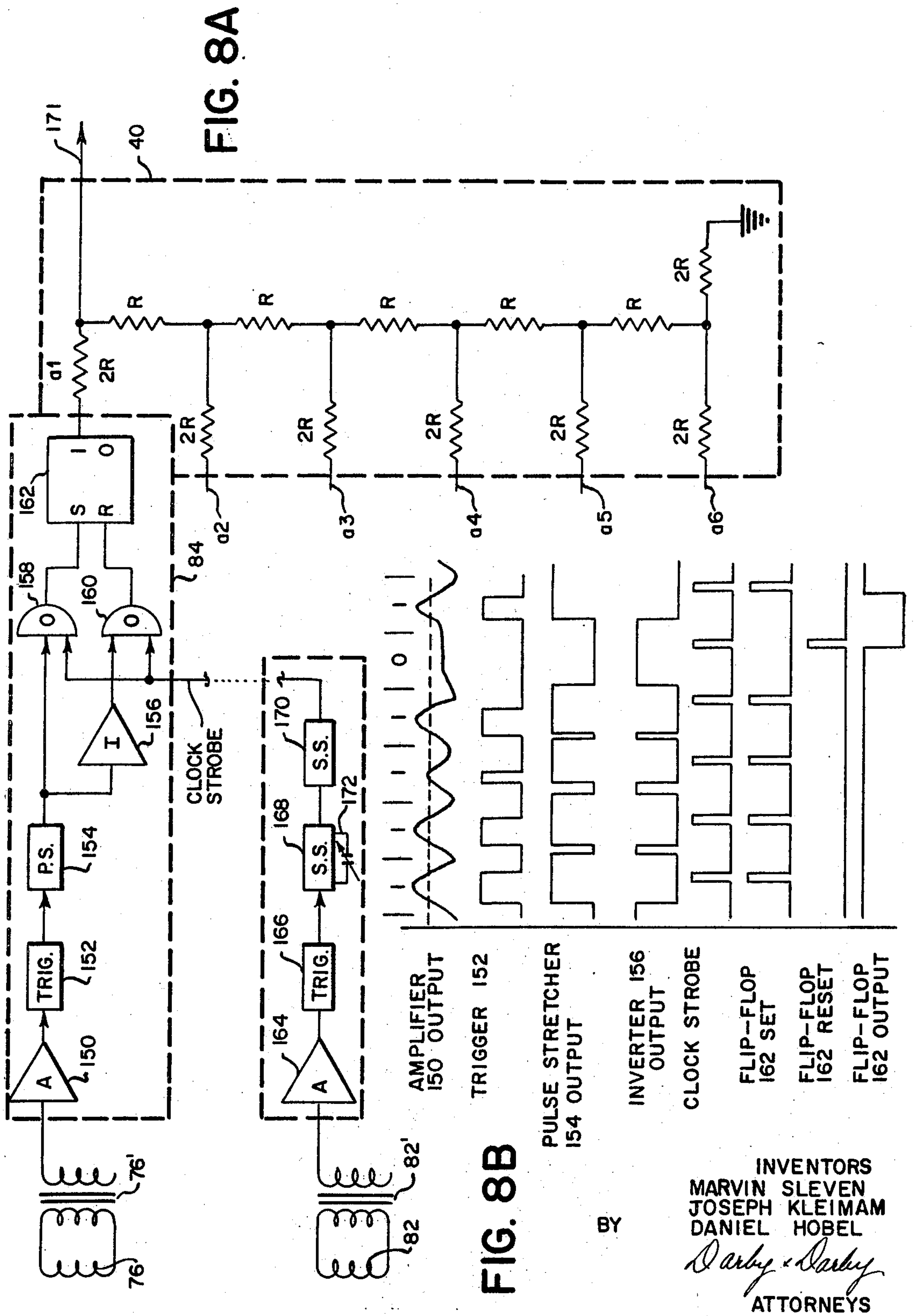
FIGURE 8A is a logic diagram of the bit processing chain and digital-to-analog converter of FIG. 2B.
FIGURE 8B is a timing chart showing the wave forms within the bit processing chains of FIGURE 8A.

FIG. 8A is detailed logic diagram of the reproduction equipment which generally will be located at a ground station and may be used to retrieve the stored information with a time compression ratio of, for example, 100 to 1.

In FIG. 8A only a single bit processing chain, corresponding to bit *a*1, is shown in conjunction with the clock processing chain 90. Each of the heads 76 to 81 couples a received signal to an amplifier 150, the output of which is coupled through a trigger 152 and a pulse stretch 154 to a conventional missing bit detector comprising inverter 156 and AND gates 158 and 160. The clock strobe pulse is generated in a similar manner by an amplifier 164, trigger 166 and two single-shot multivibrators 168 and 170. The single-shot 168 has a variable delay provided by a capacitor 172 for the purpose of optimally centering the strobe with the data bit to compensate for tape skew. The single shot 170 provides a constant width output pulse.

The digital-to-analog converters 40 are also conventional. Each employs a resistor divider network, the resistance of which is weighted as indicated in the drawing, so that each bit will contribute to the output voltage in proportion to its value. Although the timing chart of FIG. 8B shows successive signals in a single channel (e.g. successive *a*1 bits), it should be apparent that analogous waveforms exist in each channel. Since each digital-to-analog converter 40 is only responsive to the bits of a single binary word (which represents one multiplexed analog sample), the converter output on line 171 will be of the same form as the multiplexed sample derived from commutator 14.

Each of the remaining converters is identical to the construction illustrated in FIG. 8, although once the information has been recovered it can, of course, be utilized in any fashion.

FIG. 9 is a schematic showing of the tape and its associated transducers 172 and they might appear in a separate magazine assembly. Instead of aligning all of the transducers in a single track across the tape, the transducers are arrayed in two separate transverse rows each containing thirty heads. By way of an example, each of the tracks may be 0.010 inch wide and the tracks may be spaced 0.042 inch from center-line to center-line. The transducers will be offset in each line so that the longitudinal channels on tape are actually interspersed with each other. Since only fifty-seven longitudinal tracks are used, three of the transducers may be used for spare channels. The manner in which the data is stored is illustrated diagrammatically in FIG. 10B where the bit positions *a*1, *a*2, *a*3 (translated by one row of transducers) are interspersed with the bit positions *e*1, *e*2, *e*3 (translated by the other row of transducers).

Figures 9A, 9B, 10:
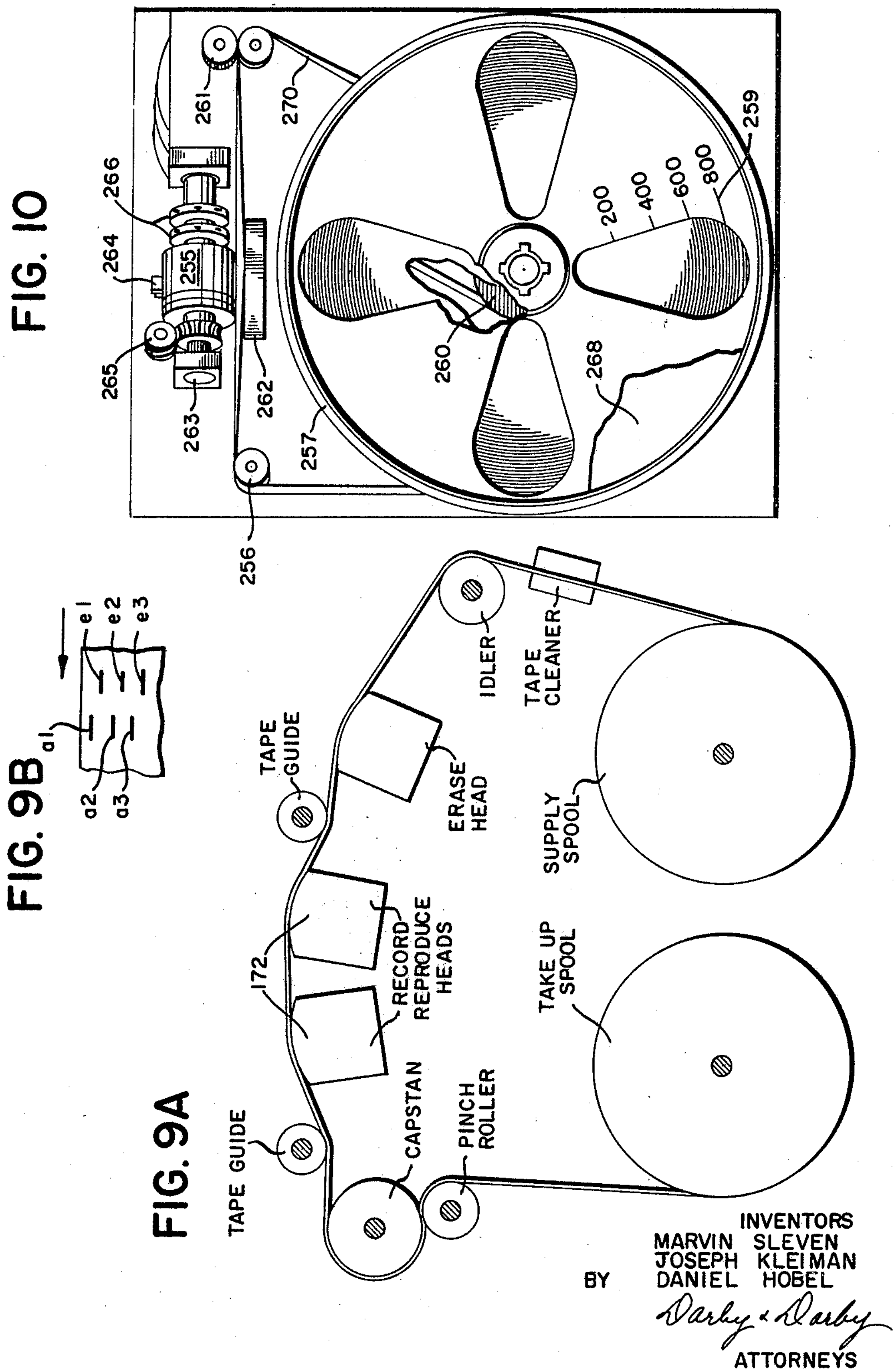
FIGURE 9A is a schematic illustration of the tape deck used in the flight recorder.
FIGURE 9B is a diagrammatic illustration showing how the transducers record the information on the storage tape.
FIGURE 10 is a perspective view of the embodiment of the invention disclosed in application No. 213,442.

The structure which comprises the magazine assembly of FIG. 9A will be stored in a housing specially designed to protect the tape and its recording from aircraft crash conditions including impact, explosion and fire. In the event of a crash, the magazine assembly should remain as a full unit, it is separated from the remainder of the recorder assembly constituting the previously described circuitry. In a known fashion, the mechanical interface with the recorder and ground reproduction assemblies will be made to claw clutches extending from the bottom of the magazine assembly. Similarly the electrical interfaces will be designed to minimize the efforts involved in making the electrical connections between the transducers and the recording/reproducing circuitry in the aircraft and the ground console.

FIGURE 10 illustrates another embodiment of the invention corresponding to the recording structure of application No. 213,442, and is a front view of the removable magazine with the cover removed showing the operative elements. The supply reel 257 has a tape scale 259 applied thereto to adequately identify the amount of tape used. Supply reel 257 and the take-up reel 268 are both mounted independently and concentrically to revolve without spindle 260. Alignment of both reels in this fashion decreases the amount of lateral area taken up by the respective spools which enables the recorder to be built in compact fashion. Magnetic tape 270 is fed from supply reel 257 past the rotary head drum 255 onto the take-up reel 258. The tape passes over aligning guide spool 256 and through the drive capstan generally shown at 261. A retractable guide shoe 262 is positioned below the tape and serves to maintain the tape in close proximity to recording head 255. When the retractable guide shoe is in operative position, i.e., an upper position, the tape 270 is maintained in close contact with the rotary drum 255. The guide shoe 262 has a concave upper surface which substantially conforms to the outer surface of the rotary drum 255, thereby serving to maintain tape 270 in close proximity to the recording drum 255, enabling precise information recordation.

To enable precise positioning of the tape with respect to recording head 264, abutments (not shown) can be attached to the retractable guide shoe 262 to maintain the tape 270 in proper position. The friction between the rotating drum 255 and tape 270 will maintain the edge of the tape 270 in constant contact with the abutment, assuring proper tape-head alignment. The rotary guide 255 revolves around the axis 263 and carries a plurality of magnetic transducer heads 264 each equally spaced about the outer surface of the drum 255. The drum is driven by the associated worm gear 265. A plurality of rotary pulse generators 266 deliver timing signals for synchronization purposes as previously explained. It can be seen that rotation of the drum 255 past the tape 270 traveling in a direction substantially transverse to the direction of rotation enables the deposition of signal information from each recording at 264 upon the tape 270 in a crosswise fashion.

In this alternative embodiment, the circumference of drum 255 is four times the width of tape 270. The drum 255 carries four individual recording heads 264 and spaced ninety degrees apart on the outside surface of the drum. Therefore, turning the drum 255 through an angle of ninety degrees will cause a single head 264 to traverse the entire width of tape 270. If the tape 270 itself is moving in the longitudinal direction, the deposited information will be placed on the tape at a slight angle to a perpendicular with respect to tape direction. When one head reaches the other side of the tape the following head will be in position to again traverse the width of the tape, and due to the longitudinal travel of the tape, successive tracks of information will be placed on the tape. One complete revolution of the drum 255 will result in a transverse recording of four information tracks on tape 270, each track being separated by a discrete distance.

Many modifications of the invention will be obvious to those skilled in the art. As to the embodiment illustrated in FIGURES 2–9, although preferred that the individual words be recorded at one time, the invention contemplates the serial recording of the discrete bits which comprise each word. Since the tape will be moving relatively slowly as the words are serially recorded, if the transducers are all aligned transverse to the tape, the respective words will be slightly offset from each other by an amount dependent upon the speed of the tape. Thus, during read-out, assuming that the same transducer structure is used, each word will not be directly beneath its associated transducer set at the identical moment in time. Nevertheless, because of the tremendous disparity in tape drive rates, the tape read-outs should be considered to be substantially simultaneous in the sense that the delay between read-out of adjacent words is negligible for all intended purposes.

Furthermore, the invention should not be restricted to any particular configuration of the individual transducers; although preferably two full rows of interleaved transducers are used, a single row or three rows, etc., may be used within the scope of the invention, and "transverse track" means a data path containing the desired information though not necessarily in a sequence of linearly aligned bits.

No effort has been made to show the specific drive means employed with the recorder and read-out circuits since, obviously, numerous well known constructions can be used for this purpose. As previously indicated the mechanical interfaces between the drive equipment and the magazine assembly illustrated in FIGURE 9*a* will be made in a conventional fashion at both the flight recorder and ground console, but the invention is not limited to any particular drive means or particular structure for driving the tape at the desired rates during recording and read-out. Similarly, those skilled in the art will recognize that the particular circuits herein illustrated are well known and that the invention should therefore not be considered in any respect as being limited to such circuits, which are illustrated only as being exemplary of a preferred embodiment. Many other modifications of the invention will be obvious to those skilled in the art, and the invention should be construed by reference to the following claims.

What we claim is:

1. A method of recording and reproducing information, comprising the steps of recording successive transverse tracks of serially arrayed information blocks across a magnetic tape while moving said tape at a first rate of speed in a direction generally transverse to said transverse tracks and recording said blocks one after the other, with each of said blocks comprising a binary word having a plurality of binary bit positions, and thereafter reading out the information blocks on said tape on a track by track basis by substantially simultaneously reading out all of the information blocks stored in each successive one of said transverse tracks while moving said tape at a rate of speed higher than said first rate of speed in a direction generally transverse to said transverse tracks.

2. A method of recording and reproducing information according to claim 1, wherein said step of serially recording information is accomplished by gating the binary form of said information blocks to a plurality of transducers arrayed across the magnetic tape storage medium, there being one transducer for each bit position in a single transverse track.

3. A method of recording and reproducing information according to claim 1, wherein said step of serially recording said information blocks is accomplished by moving at least one transducer across said tape along said transverse track.

4. A method of recording and reproducing information according to claim 1, wherein said information represents a plurality of analog signals, including the steps of multiplexing said analog signals to form a serial train with respect to time of multiplexed analog signals, and converting said serial train to binary signals prior to recording.

5. A method of recording and reproducing information according to claim 4, including the step of recording a clock pulse in one of the bit positions of each binary word recorded.

6. A method of recording and reproducing information according to claim 1 further comprising the step of coupling said information blocks as read from said transverse tracks to a plurality of output means, the information block corresponding to a single one of said words being coupled to a separate one of said output means.

7. A method of recording and reproducing information according to claim 6, wherein said step of serially recording information is accomplished by gating the binary form of said information blocks to a plurality of transducers arrayed across the magnetic tape storage medium, there being one transducer for each bit position in a single transverse track.

8. A method of recording and reproducing information according to claim 6, wherein said step of serially recording and said information blocks is accomplished by moving at least one transducer across said tape along said transverse track.

9. A method of recording and reproducing information according to claim 6, wherein said information represents a plurality of analog signals, including the steps of multiplexing said analog signals to form a serial train with respect to time of multiplexed analog signals, and converting said serial train to binary signals prior to recording.

10. Recording apparatus for recording data on a movable magnetic tape, comprising commutator means for providing successive series of multiplexed analog signals, each of said series including a plurality of analog samples corresponding respectively to said analog signals, means for converting each of said analog samples into a binary word consisting of a plurality of discrete binary bits, means for serially recording a plurality of said binary words in a single transverse track across said magnetic tape, said track extending in a direction transverse the direction in which said tape is moved, and timing means for causing said recording means to record the binary words in a single one of said transverse tracks one after other.

11. A recorder according to claim 10, including means for simultaneously recording all of the bits corresponding to a single binary word.

12. A recorder according to claim 11, wherein said last named means comprises a plurality of transducer sets, there being one of said transducer sets for each binary word to be recorded in a transverse track, the number of transducers in each of said transducer sets being equal to the number of bits in binary word.

13. A recorder according to claim 10, wherein said means for recording comprises means for serially recording each of the binary bits corresponding to an individual binary word.

14. A recorder according to claim 13, wherein said last named means includes at least one transducer and means for moving said transducer transversely with respect to the tape.

References Cited

UNITED STATES PATENTS

| | | | |
|---|---|---|---|
| 2,986,725 | 5/1961 | Dirks | 340—174.1 |
| 3,293,608 | 12/1966 | Klein et al | 340—172.5 |
| 3,333,247 | 7/1967 | Hadley et al. | 340—172.5 |
| 3,366,924 | 1/1968 | Brown | 340—15.5 |
| 3,366,933 | 1/1968 | Carp et al. | 340—172.5 |
| 3,376,557 | 4/1968 | Godinez | 340—172.5 |
| 3,416,140 | 12/1968 | Cassidy et al. | 340—172.5 |

RAULFE B. ZACHE, Primary Examiner

U.S. Cl. X.R.

340—174.1